United States Patent
Ryan et al.

(10) Patent No.: US 8,054,022 B1
(45) Date of Patent: Nov. 8, 2011

(54) REDUCED ACOUSTIC NOISE DURING SPIN-UP BY DRIVING A SPINDLE MOTOR OPEN LOOP USING SINUSOIDAL SIGNALS

(75) Inventors: Robert P. Ryan, Mission Viejo, CA (US); Brett A. Henne, Lake Forest, CA (US); Steven Nemshick, Santa Ana, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 662 days.

(21) Appl. No.: 12/146,678

(22) Filed: Jun. 26, 2008

(51) Int. Cl.
*H02P 6/18* (2006.01)

(52) U.S. Cl. ......... 318/400.34; 318/400.11; 318/400.12; 318/400.32; 318/254.1

(58) Field of Classification Search ............ 318/400.11, 318/400.12, 400.32, 400.34, 400.35, 400.42, 318/248, 251, 252, 254.1, 459; 360/73.03, 360/74.1, 77.02, 77.03, 77.04
See application file for complete search history.

(56) References Cited

U.S. PATENT DOCUMENTS

| | | | |
|---|---|---|---|
| 5,798,623 A * | 8/1998 | El-Sadi | 318/400.17 |
| 5,915,861 A | 6/1999 | Wegmann et al. | |
| 6,140,793 A | 10/2000 | Carr et al. | |
| 6,236,174 B1 | 5/2001 | White | |
| 6,280,088 B1 | 8/2001 | Leuthold et al. | |
| 6,534,936 B2 * | 3/2003 | Messenger et al. | 318/400.35 |
| 6,577,088 B2 * | 6/2003 | Heydt et al. | 318/400.34 |
| 6,825,622 B1 * | 11/2004 | Ryan et al. | 318/400.2 |
| 6,943,523 B2 | 9/2005 | Feres | |
| 6,946,808 B2 * | 9/2005 | Kandori | 318/400.33 |
| 7,026,781 B2 | 4/2006 | Yamazaki et al. | |
| 7,071,640 B2 * | 7/2006 | Kurosawa et al. | 318/400.04 |
| 7,253,582 B1 * | 8/2007 | Ding et al. | 318/652 |
| 7,294,982 B2 | 11/2007 | Kurosawa et al. | |
| 2002/0190673 A1 * | 12/2002 | Brenden et al. | 318/254 |

OTHER PUBLICATIONS

George Pelz, "Designing Circuits for Disk Drives", Proceedings of the International Conference on Computer Design: VLSI in Computers & Processors, Sep. 23, 2001.

* cited by examiner

*Primary Examiner* — Bentsu Ro
*Assistant Examiner* — Thai Dinh

(57) ABSTRACT

A disk drive is disclosed comprising a disk, a head actuated over the disk, and a spindle motor for rotating the disk, wherein the spindle motor comprises a plurality of windings. During a spin-up operation of the disk, a sinusoidal driving signal is applied to each winding of the spindle motor for a spin-up interval, wherein during at least eighty percent of the spin-up interval the sinusoidal driving signals are applied to the windings of the spindle motor open loop.

22 Claims, 11 Drawing Sheets

| TIME/STEP | # STEPS |
|---|---|
| 5000 | 2 |
| 3333 | 3 |
| 2500 | 4 |
| 2000 | 5 |
| 1667 | 6 |
| 1429 | 7 |
| 1111 | 9 |
| 1250 | 8 |
| 909 | 11 |
| 833 | 12 |
| 833 | 12 |
| 833 | 12 |
| 667 | 15 |
| 667 | 15 |
| 588 | 17 |
| 556 | 18 |
| 526 | 19 |
| 500 | 20 |
| 476 | 21 |
| 455 | 22 |

REDUCED ACOUSTIC NOISE DURING SPIN-UP BY DRIVING A SPINDLE MOTOR OPEN LOOP USING SINUSOIDAL SIGNALS

BACKGROUND

FIG. 1 shows a prior art disk drive comprising a disk 2, a head 4 actuated over the disk 2 by a voice coil motor (VCM) 6, and a multi-phase spindle motor 8 for rotating the disk 2. The multi-phase spindle motor 8 comprises a plurality of windings (e.g., φA, φB, φC) which when driven with current generate a magnetic field that interacts with the magnetic field of permanent magnets (not shown) to generate a rotational torque. The disk 2, head 4, VCM 6, and spindle motor 8 are typically housed in a head disk assembly (HDA) 10, wherein control circuitry 12 mounted on a printed circuit board is typically attached to the HDA 10.

The control circuitry 12 commutates the windings of the spindle motor 8 over commutation intervals using any suitable commutation sequence. For example, commutation logic 14 may control switches 16 to commutate the windings of the spindle motor 8 in a two-phase, three-phase, or hybrid two-phase/three-phase commutation sequence. A commutation controller 18 applies a control signal 20 to the commutation logic 14 in order to transition between the commutation states.

The windings of the spindle motor 8 are connected to a back electromotive force (BEMF) detector 22 which detects threshold crossings (e.g., zero crossings) in the BEMF voltage generated by the windings with respect to the center tap. Since the BEMF voltage is distorted when current is flowing, the commutation controller 18 signals the BEMF detector 22 over line 23 when an "open" winding is generating a valid BEMF signal. At each BEMF threshold crossing the BEMF detector 22 toggles a signal to generate a square wave signal 24. The frequency of the BEMF threshold crossings and thus the frequency of the square wave signal 24 represent the speed of the spindle motor 8. The commutation controller 18 evaluates the square wave signal 24 and adjusts the control signal 20 in order to control the speed of the spindle motor 8.

The spindle motor 8 may be driven using any suitable driving signals, such as with square or trapezoidal waves, but the preferred driving signal is a sinusoidal wave. Example sinusoidal driving signals applied to the windings of the spindle motor 8 are shown in FIG. 2, wherein the frequency of the sinusoids is controlled closed loop in response to the BEMF signal 24. Each sinusoidal signal may be applied to a spindle motor winding using a linear amplifier, or each sinusoidal signal may modulate a PWM signal for driving the respective switches 16 shown in FIG. 1.

When the disk 2 is spun up after the disk drive is powered on or exits an idle mode, the BEMF signal 24 is not a reliable velocity sensor. Therefore, the prior art typically employs some other form of closed loop feedback to spin-up the disk 2, such a technique referred to as inductive sense. With inductive sense, the BEMF detector 22 periodically senses the angular position of the spindle motor 8 and generates a corresponding inductive sense signal 26. The commutation controller 18 processes the inductive sense signal 26 in order to commutate the windings of the spindle motor 8 at the appropriate time. A problem with using inductive sense as closed loop feedback during spin-up is the acoustic noise generated each time the driving signals are disabled (or modified) in order to make an inductive sense measurement.

BRIEF DESCRIPTION OF THE DRAWINGS

FIG. 7 shows an example sine table according to an embodiment of the present invention wherein each cycle of a sine wave comprises 48 steps.

DETAILED DESCRIPTION OF EMBODIMENTS OF THE INVENTION

Figure 1:
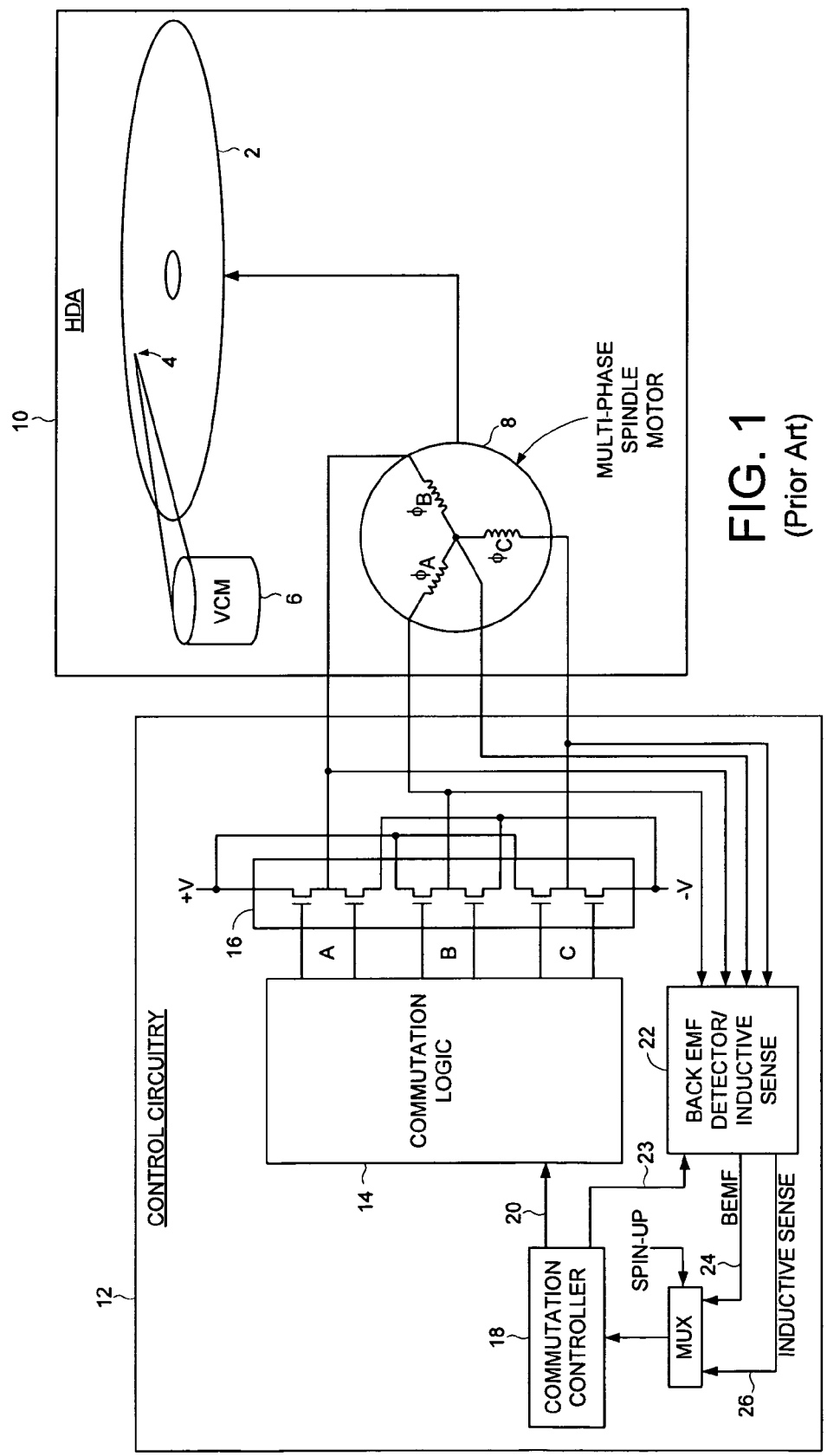
FIG. 1 shows a prior art disk drive comprising control circuitry for driving a spindle motor closed loop using inductive sense during spin-up.
Figure 2:
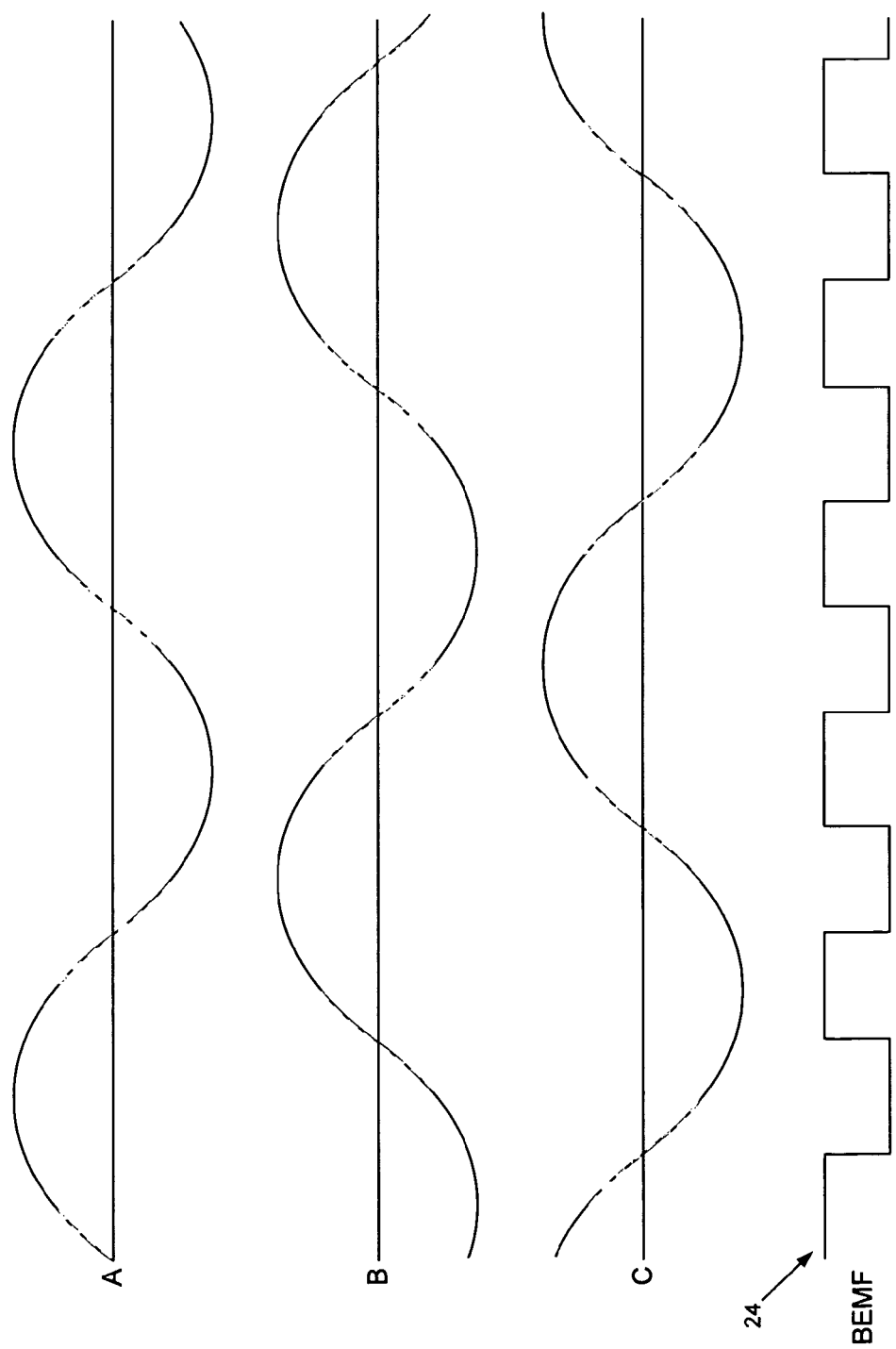
FIG. 2 shows prior art sinusoidal driving signals for driving the spindle motor closed loop in response to a BEMF signal.
Figure 3:
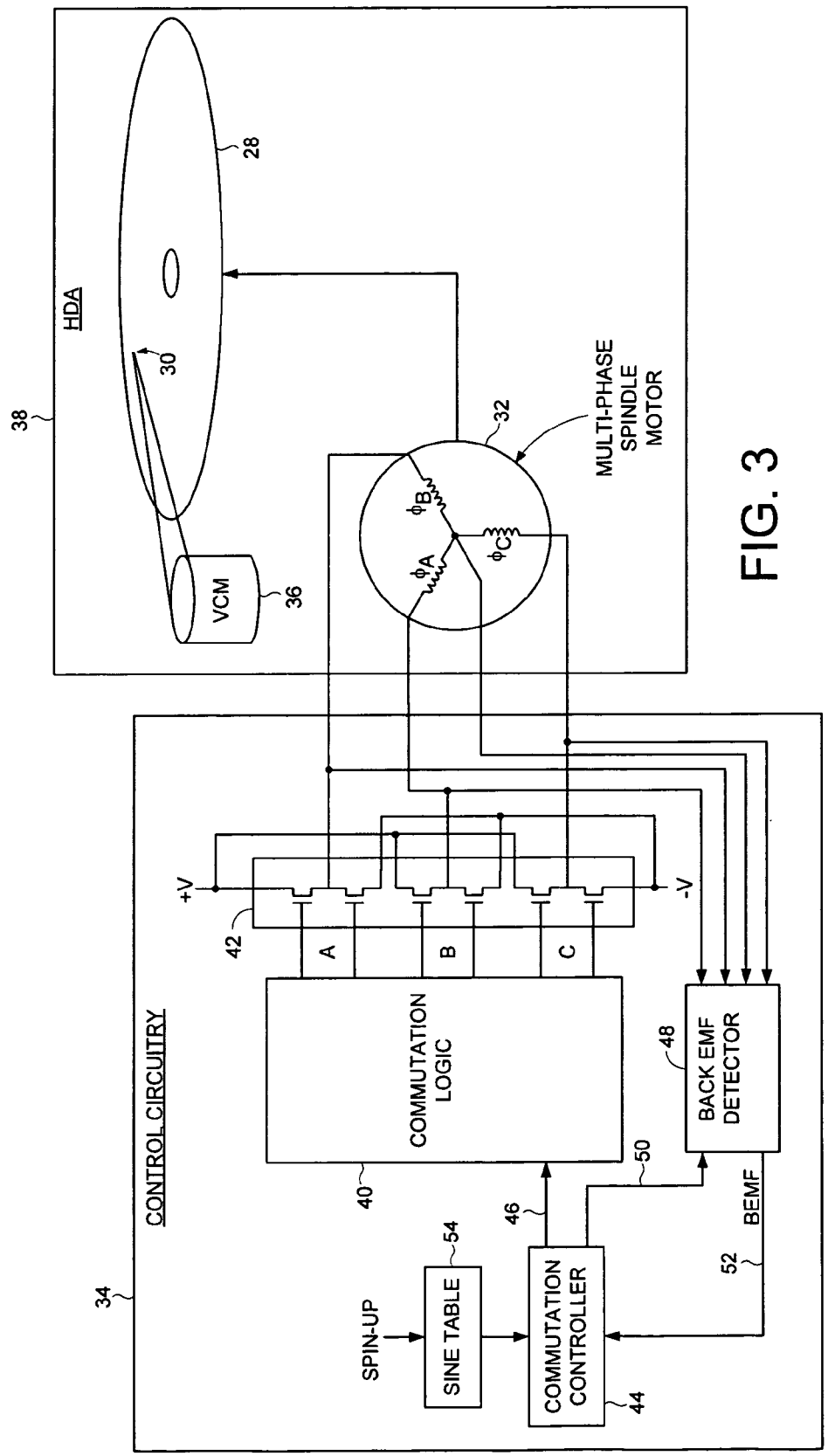
FIG. 3 shows a disk drive according to an embodiment of the present invention including control circuitry for driving the spindle motor open loop with sinusoidal signals during spin-up.

FIG. 3 shows a disk drive according to an embodiment of the present invention comprising a disk 28, a head 30 actuated over the disk 28, and a spindle motor 32 for rotating the disk 28, wherein the spindle motor 32 comprises a plurality of windings (e.g., φA, φB, φC). During a spin-up operation of the disk 28, control circuitry 34 applies a sinusoidal driving signal to each winding of the spindle motor 32 for a spin-up interval, wherein during at least eighty percent of the spin-up interval the sinusoidal driving signals are applied to the windings of the spindle motor open loop.

In the embodiment of FIG. 3, a voice coil motor (VCM) 36 rotates an actuator arm about a pivot in order to actuate the head 30 radially over the disk 28. The VCM 36, head 30, and spindle motor 32 are housed in a head disk assembly (HDA) 38, and the control circuitry 34 is mounted to a printed circuit board which is coupled to the HDA 38.

The control circuitry 34 commutates the windings of the spindle motor 32 over commutation intervals using any suitable commutation sequence. For example, commutation logic 40 may control switches 42 to commutate the windings of the spindle motor 32 in a two-phase, three-phase, or hybrid two-phase/three-phase commutation sequence. A commutation controller 44 applies a control signal 46 to the commutation logic 40 in order to transition between the commutation states.

The windings of the spindle motor 32 are connected to a back electromotive force (BEMF) detector 48 which detects threshold crossings (e.g., zero crossings) in a BEMF voltage generated by the windings with respect to the center tap. Since the BEMF voltage is distorted when current is flowing, the commutation controller 44 signals the BEMF detector 48 over line 50 when an "open" winding is generating a valid BEMF signal. At each BEMF threshold crossing the BEMF detector 48 toggles a signal to generate a square wave signal 52. The frequency of the BEMF threshold crossings and thus the frequency of the square wave signal 52 represent the speed of the spindle motor 32. The commutation controller 44 evaluates the square wave signal 52 and adjusts the control signal 46 in order to control the speed of the spindle motor 32.

Figure 4:
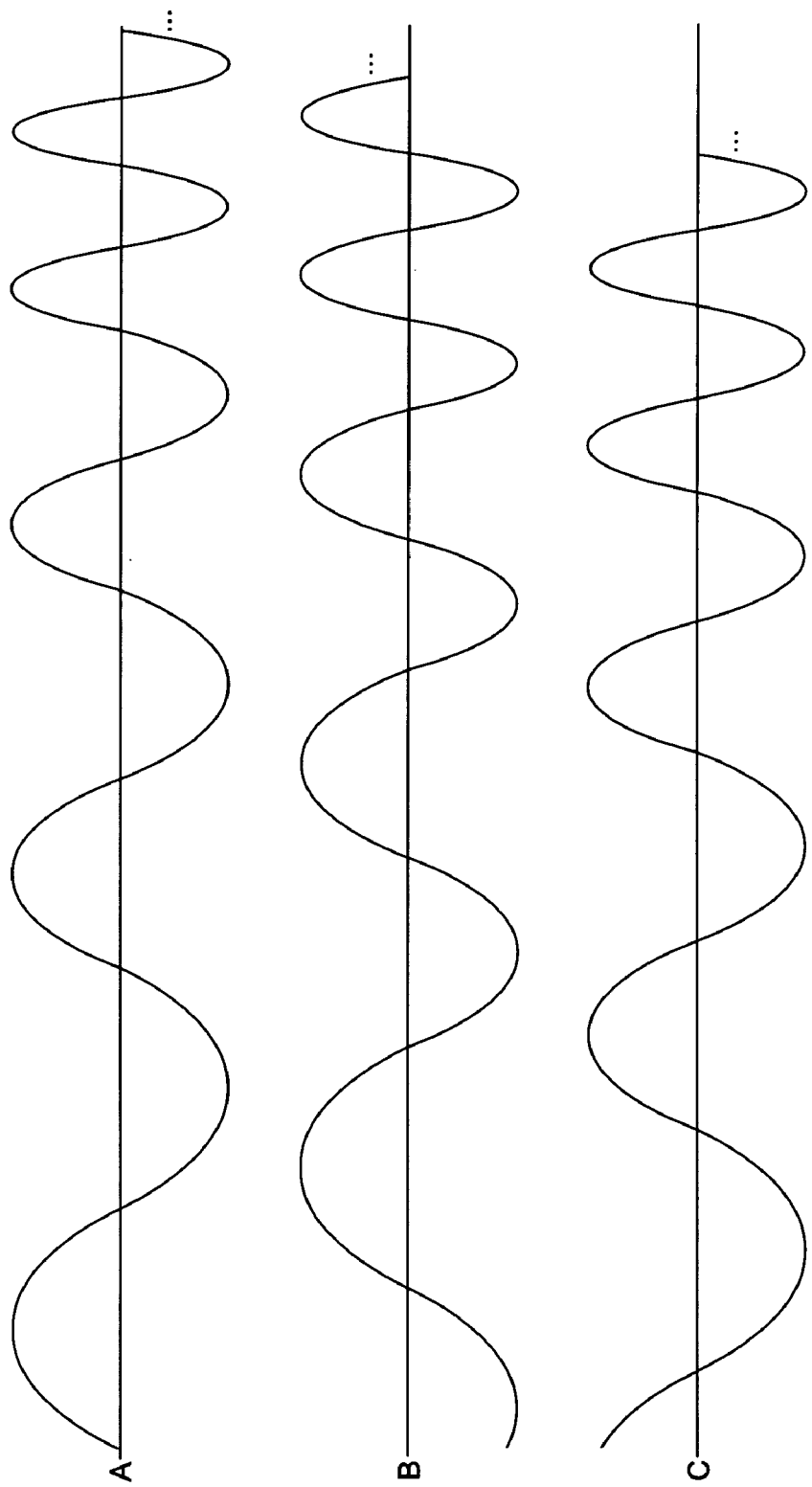
FIG. 4 shows an embodiment of the present invention wherein a frequency of the sinusoidal signals increases during the spin-up interval.

During at least eighty percent of a spin-up interval, the commutation controller 44 drives the windings of the spindle motor open loop using sinusoidal driving signals which may be generated in any suitable manner, such as in continuous time or discrete time. In one embodiment, the sinusoidal driving signals are generated in discrete time using a sine table 54 as shown in FIG. 3. After the spin-up interval, the commutation controller 44 applies a driving signal to each winding of the spindle motor closed loop in response to the BEMF signal 52. In one embodiment, a frequency of the sinusoidal driving signals increases over the spin-up interval in order to accelerate the spindle motor as illustrated in the example of FIG. 4.

Figure 5:
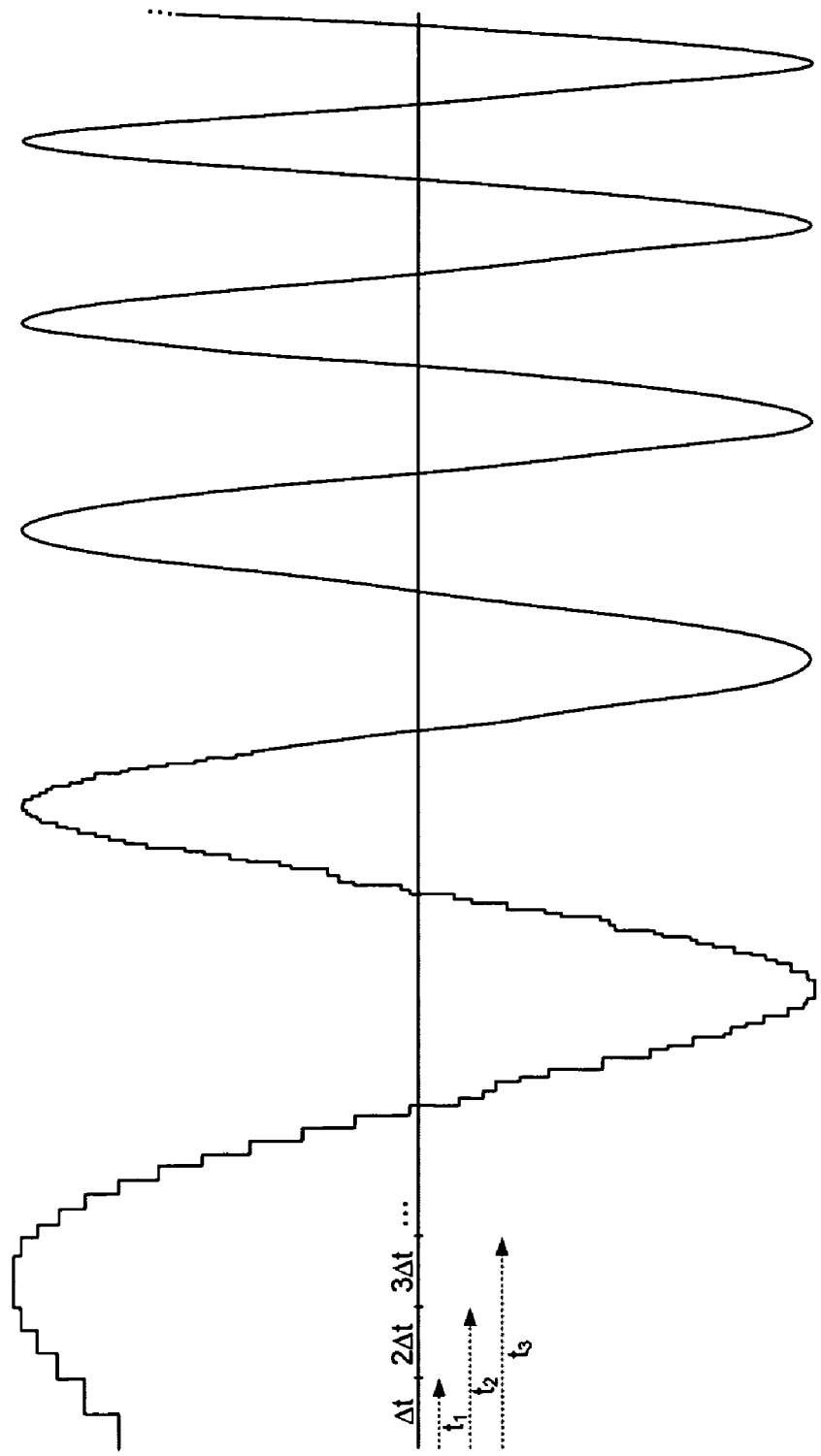
FIG. 5 shows an embodiment of the present invention wherein the sinusoidal driving signals are generated using a sine table.

In one embodiment, the sine table 54 of FIG. 3 comprises a plurality of entries, wherein each entry comprises a number of steps and each step corresponds to a fraction of a sinusoidal wave. In one embodiment, each entry of the sine table corresponds to a fraction of a spin-up interval, and in one embodiment, each entry of the sine table comprises an equal fraction of the spin-up interval. FIG. 5 shows an embodiment of the present invention wherein each cycle of a sinusoid comprises 48 steps (each step corresponds to 360/48 degrees), and each entry of the sine table corresponds to a fraction $\Delta t$ of the spin-up interval. In an alternative embodiment, at least two entries of the sine table may correspond to a different fraction of the spin-up interval, for example, a first entry may correspond to $\Delta t$ and a second entry may correspond to $x*\Delta t$ where x may be less than or greater than one.

In the example of FIG. 5, the initial angular position of the spindle motor is zero degrees such that to generate maximum torque, the sine wave is generated with a 90 degree phase lead. In one embodiment, the control circuitry 34 is operable to measure an initial angular position of the spindle motor in order to initialize the sinusoidal driving signals. In one embodiment, the control circuitry 34 is operable to measure an initial angular position of the spindle motor in order to determine an initial entry in the sine table to generate the sinusoidal driving signals. Referring again to FIG. 5, in one embodiment, the control circuitry 34 generates the same sine wave with a suitable phase shift corresponding to the initial angular position of the spindle motor. The sine wave may be generated in any suitable manner, such as generating a table of sine waves each corresponding to a different possible initial angular position (and in one embodiment, each sine wave corresponds to a range of initial angular positions). In another embodiment, the control circuitry 34 generates the sine wave having the suitable phase shift on the fly as a function of the initial angular position.

In one embodiment, the control circuitry 34 initializes the sinusoidal driving signals in response to an initial angular position of the spindle motor and an initial angular velocity of the spindle motor. Referring again to the embodiment of FIG. 5, if the initial angular position of the spindle motor is zero, the control circuitry will generate a similar sine wave having an initial higher frequency corresponding to the initial non-zero velocity of the spindle motor. In one embodiment, the initial velocity of the spindle motor is used to "jump" into the sine wave of FIG. 5, and then the resulting sine wave is phase shifted to correspond to the initial angular position of the spindle motor.

The sine table 54 may be generated in any suitable manner. In an embodiment illustrated in the flow diagram of FIG. 6A, the sine table 54 is generated using a Monte Carlo algorithm. A number of parameters are initialized (step 56), including a number of microsteps per cycle (48 in the example), a number of com states (6 in the example), a number of electrical cycles (6 in the example), a target rpm (500 in the example), a number of runs (1,000 in the example), a time delta $\Delta t$ (10 milliseconds in the example), and a counter j. A time interval is initialized to zero (step 58), wherein the time interval represents a fraction of a spin-up interval. A number of parameters for computing a number of steps per angular position of the spindle motor are initialized (step 60), including a parameter m which correlates a step increment m to a number of angular degrees of the spindle motor, and a phase shift parameter b which corresponds to a 90 degree phase lead from the current angular position of the spindle motor.

Figure 6A:
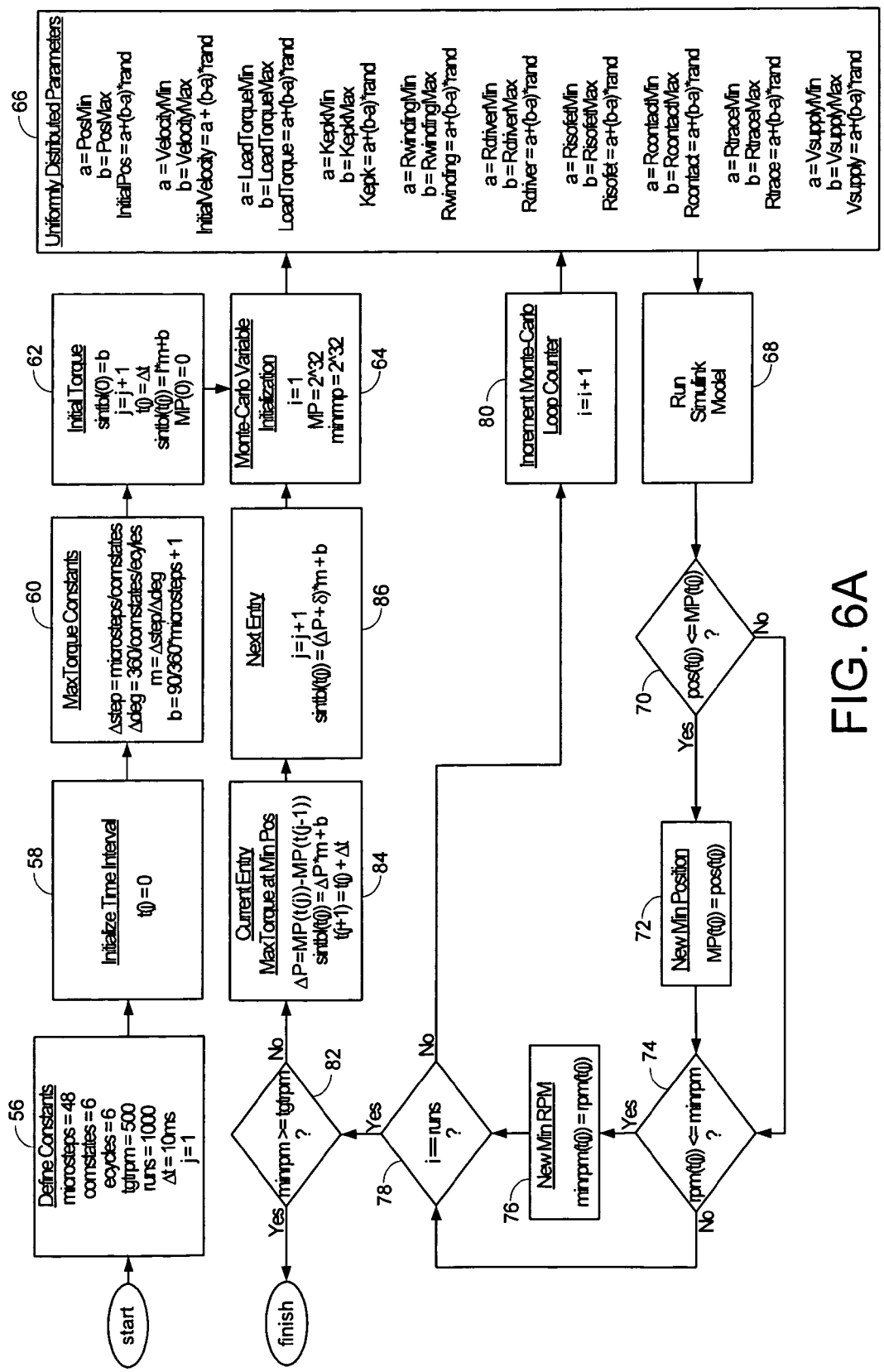
FIG. 6A is a flow diagram according to an embodiment of the present invention wherein the sine table is generated using a Monte Carlo algorithm.

In the embodiment of FIG. 6A, the initial angular position of the spindle motor is assumed to be zero degrees such that the zero entry of the sine table is initialized to a 90 degree phase shift for maximum torque (step 62). In an alternative embodiment, the initial angular position is assumed to be less than zero degrees to account for variations in the mechanical characteristics of the windings, and the zero entry of the sine table is initialized accordingly (e.g., initialized to m*PosMin+b). The first entry of the sine table is initialized to a suitable number of angular degrees of the spindle motor which represents an estimate of the minimum position of the spindle motor after the first time interval $\Delta t$. In the example of FIG. 5, the first entry of the sine table may be initialized to comprise one step which corresponds to (1/48)*360 degrees of the sine wave cycle. A number of Monte Carlo variables are initialized (step 64), including a minimum position (MP) and a minimum RPM (minrpm) of the spindle motor which are set to a maximum value.

A number of spindle motor parameters are configured (step 66), and in one embodiment, each parameter value is generated using a random number in order to uniformly distribute the parameter values over the plurality of Monte Carlo iterations. The parameter values correspond to possible values that a spindle motor of a production disk drive may take on. For example, the winding resistance may vary from drive to drive, as well as vary over time due to environmental conditions such as temperature. In the embodiment of FIG. 6A, the parameters include an initial angular position of the spindle motor as measured, for example, using inductive sense. Since there will be an error in the estimated initial position, a parameter is configured to take on the possible variance from the estimated initial position. In the example of FIG. 6A, the estimated initial position is zero degrees, with a variance from PosMin to PosMax due to an error in measuring the initial angular position. The spindle motor parameters in the embodiment of FIG. 6A include:

Initial Position—Initial spindle motor position.
Initial Velocity—Initial spindle motor velocity.
Load Torque—One or more of opposing torques (e.g., windage friction and/or bearing friction) acting on the spindle motor.
Kepk—Defines the developed torque that opposes the load torque acting on the spindle motor.
Rwinding—Phase to phase coil winding resistance of the spindle motor.
Rdriver—The on-state resistance of the driver MOSFETs.
Risofet—The on-state resistance of the MOSFET that is used to isolate the input supply to the motor supply.
Rtrace—The resistance from the power ASIC to the motor connections.

Rcontact—The resistance of the PCBA to HDA contact point.

Vsupply—The input supply voltage.

After configuring the spindle motor parameters, a Monte Carlo iteration is executed by simulating a spin-up operation (step 68) over the current time interval (one Δt) as shown in FIG. 5 using the two entry sine table. At the end of the simulation, the current angular position of the spindle motor is compared to the minimum angular position (step 70), and if smaller, the minimum angular position is replaced with the current angular position (step 72). If the current angular velocity is less than the minimum angular velocity (step 74), then the minimum angular velocity is replaced with the current angular velocity (step 76). If the number of Monte Carlo iterations has not been reached (step 78), then the counter i is incremented (step 80), the spindle motor parameters reconfigured (step 66), and another simulation spin-up executed for the same time interval.

When the number of Monte Carlo iterations is reached (step 78), and the minimum rpm is less than the target rpm (step 82), then the current entry of the sine table is configured (step 84) based on the minimum angular position of the spindle motor across all of the Monte Carlo iterations. A change in the minimum position ΔP is computed as a difference between the current minimum position and the previous minimum position, and the change in position ΔP is used to configure the current sine table entry with the corresponding number of steps. For example, consider the first entry of the sine table corresponding to the first time interval Δt of FIG. 5 which was originally initialized to one step ((1/48)*360 degrees of a sine wave cycle). The actual change in position ΔP after executing the Monte Carlo iterations may correspond to two steps or (2/48)*360 degrees of a sine wave cycle as shown in FIG. 5.

After configuring the current entry of the sine table, the next entry of the sine table is configured (step 86) with an estimate of the next change in position for the next time interval. In the embodiment of FIG. 6A, the next entry of the sine table is configured by adding a suitable offset δ to the current change in position ΔP. The Monte Carlo algorithm is then re-executed starting with step 64 for a number of iterations, wherein each iteration is executed from a time of zero up to the current time interval. For example, in the embodiment of FIG. 6A, the second time interval is two time deltas (2*Δt) as shown in FIG. 5. After executing the Monte Carlo iterations, the current entry of the sine table is configured based on the new change in position ΔP (the change in the minimum angular position of the spindle motor after the current time interval).

The flow diagram of FIG. 6A is repeated for increasingly longer time intervals thereby configuring each entry of the sine table so as to define the sine wave shown in FIG. 5. When the minimum angular velocity of the spindle motor reaches the target angular velocity (step 82), the sine table is defined over the entire spin-up interval. In one embodiment, the target angular velocity corresponds to the velocity where the control circuitry 34 switches over to using the BEMF signal 52 in closed loop control of the spindle motor.

In one embodiment, after defining the sine table by running spin-up simulations over the Monte Carlo iterations, the sine table is copied into each production disk drive during manufacturing. For example, the sine table may be stored in a non-volatile semiconductor memory (e.g., a Flash memory) of each production disk drive.

In the embodiment of FIG. 5, the amplitude of the sine wave is static over the spin-up interval as well as over the Monte Carlo iterations. In an alternative embodiment, the amplitude of the sine wave may change over the spin up interval, such as increasing or decreasing over the spin-up interval. In another embodiment, the amplitude of the sine wave may be adjusted over the Monte Carlo iterations in order to optimize the final amplitude of the sine wave used in the production disk drives.

Figure 6B:
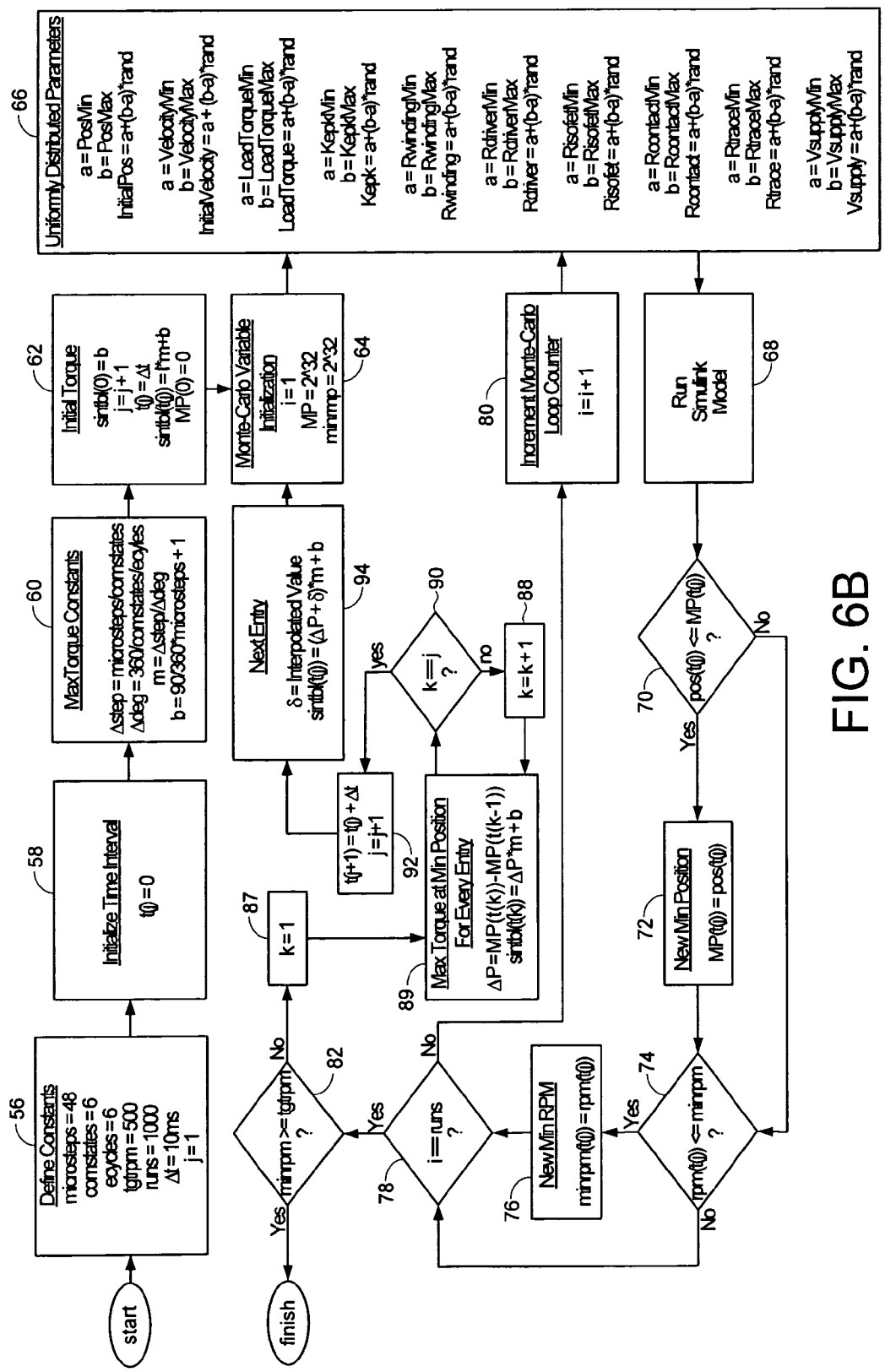
FIG. 6B is a flow diagram according to an embodiment of the present invention wherein a next entry of the sine table is generated by computing an interpolated value.

FIG. 6B shows a flow diagram according to an embodiment of the present invention wherein after each Monte Carlo iteration, a counter is initialized (step 87) and the corresponding sine table entry is adjusted in response to the minimum angular position at the corresponding time interval (step 89). The counter is adjusted (step 88) and the next entry of the sine table is adjusted in response to the minimum angular position at the corresponding time interval (step 89) until all of the entries have been adjusted up to the current time interval (step 90). The time interval is then incremented (step 92) and the next entry of the sine table is configured with an estimate of the next change in position for the next time interval (step 94). In the embodiment of FIG. 6B, the estimated change in position is computed by interpolating the previous change in positions.

FIG. 7 shows an example sine table wherein each entry corresponds to a time delta Δt (10 milliseconds in the example of FIG. 5) and the number of steps per entry which corresponds to the change in the minimum position ΔP described above at each time interval. In other words, the number of steps per entry corresponds to a fraction of the sinusoidal wave which corresponds to the change in the minimum position ΔP. The number of steps per entry increases since the spindle motor is accelerating during the spin-up interval (ΔP is increasing during the spin-up interval).

Figure 8A:
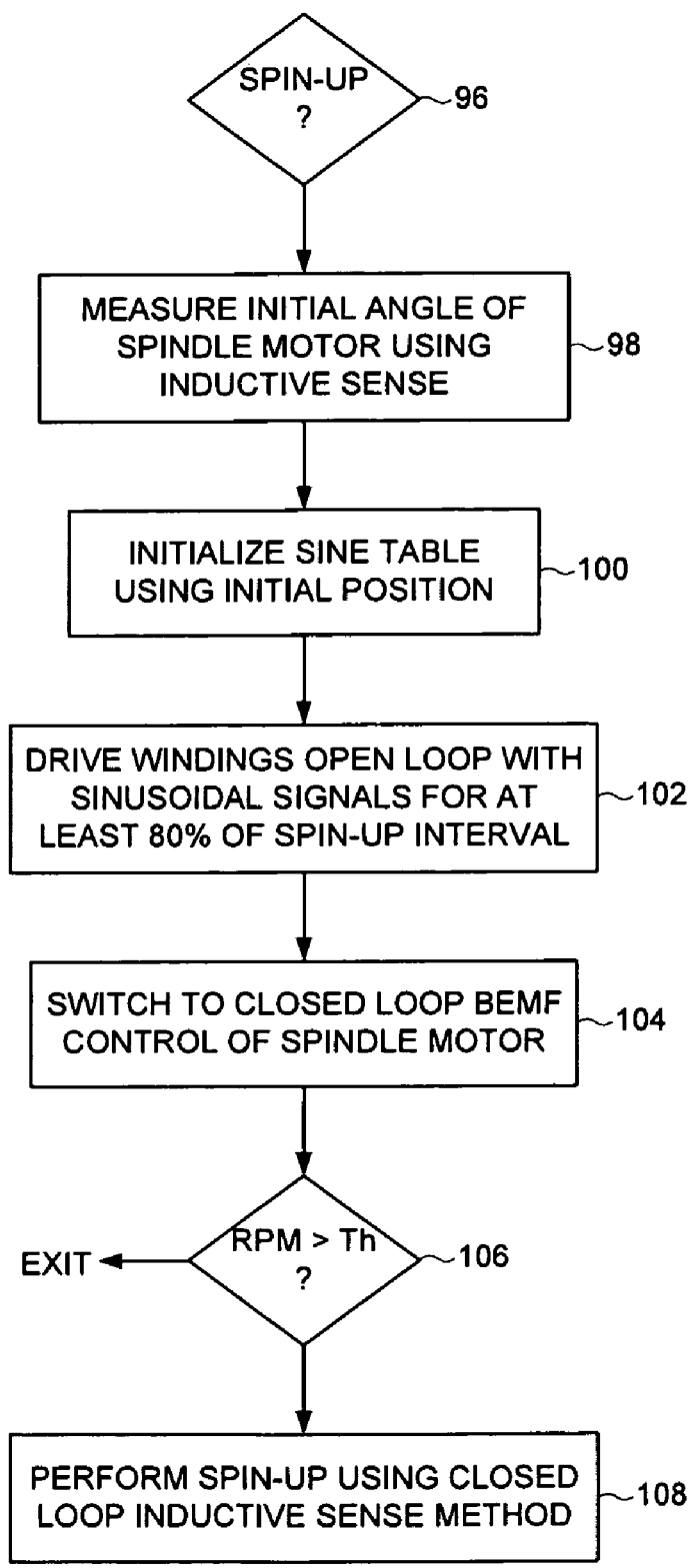
FIG. 8A is a flow diagram according to an embodiment of the present invention wherein an initial angle of the spindle motor is measured, and then used to initialize the sine table.

FIG. 8A is a flow diagram according to an embodiment of the present invention for spinning up the disk open loop using a sine table according to an embodiment of the present invention. When a spin-up operation is initiated (step 96), an initial angular position of the spindle motor is measured (step 98) and used to initialize the sine table (step 100) by adjusting a corresponding phase shift of the sine table. The initial angular position of the spindle motor may be measured using any suitable technique, such as with inductive sense. The windings are then driven open loop for at least eighty percent of a spin-up interval using the sine table (step 102). After the spin-up interval, the control circuitry 34 switches to a closed loop control of the spindle motor in response to the BEMF signal 52 in order to finish the spin-up operation (step 104). If after the spin-up operation the angular velocity of the spindle motor is greater than a threshold (step 106), the control circuitry 34 begins spinning the disk at a constant angular velocity for normal operation. However, if after the spin-up operation the angular velocity of the spindle motor is less than the threshold (step 106) it indicates that the spin-up operation failed. In one embodiment, when the spin-up operation fails, the spin-up operation is re-executed using closed loop control by employing an inductive sense technique (step 108).

Figure 8B:
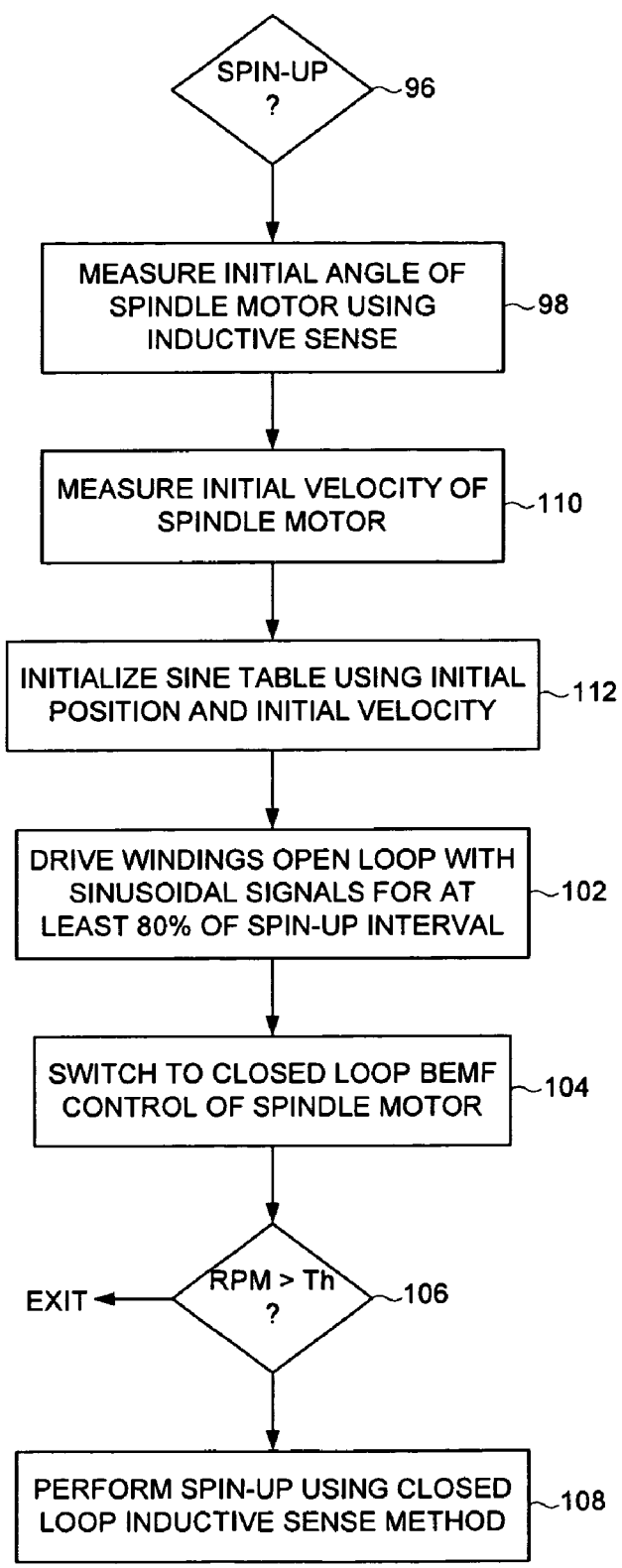
FIG. 8B is a flow diagram according to an embodiment of the present invention wherein an initial velocity of the spindle motor is measured, and then used to initialize the sine table.

FIG. 8B is a flow diagram according to an embodiment of the present invention which extends the flow diagram of FIG. 8A. When a spin-up operation is initiated (step 96) an initial angular position of the spindle motor is measured (step 98) and an initial angular velocity of the spindle motor is measured (step 110). The initial angular velocity of the spindle motor may be measured using any suitable technique, such as using an inductive sense technique, or using the BEMF signal 52. The sine table is then initialized (step 112) using both the initial angular position of the spindle motor and the initial angular velocity of the spindle motor. The initial angular velocity of the spindle motor determines a corresponding offset into the sine table (e.g., an initial offset into the sine wave of FIG. 5), and the initial angular position of the spindle motor determines a corresponding phase shift of the sine table.

Figure 9:
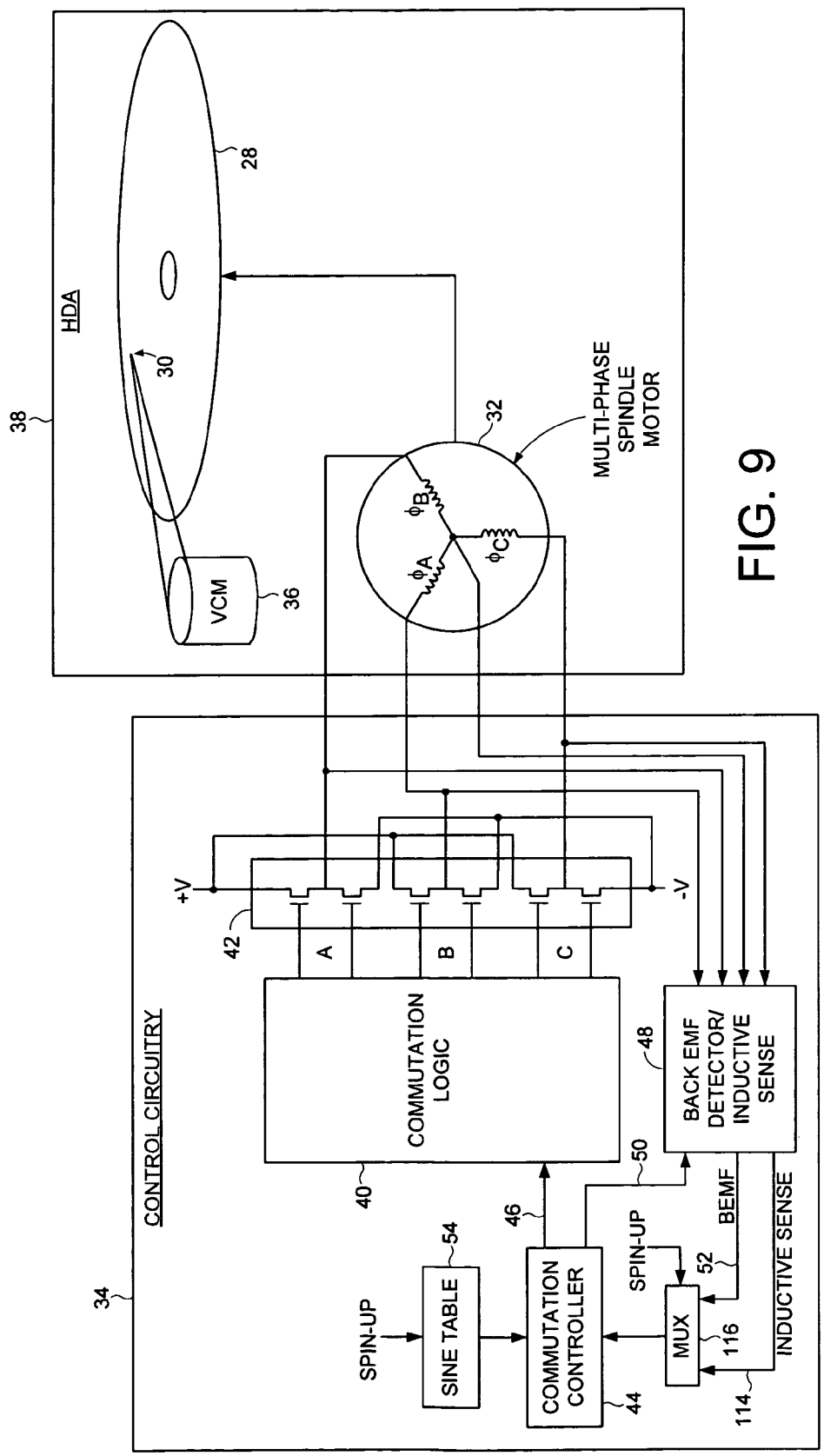
FIG. 9 shows a disk drive according to an embodiment of the present invention including control circuitry for driving a spindle motor closed loop using inductive sense during spin-up if the open loop sine table technique fails.

FIG. 9 shows an embodiment of the present invention wherein the BEMF detector 48 generates an inductive sense signal 114 representing an angular position of the spindle motor. If the open loop spin-up operation using the sine table 54 fails at any time during the lifetime of a production disk drive, the commutation controller 44 may re-execute the spin-up operation closed loop in response to the inductive sense signal 114. A multiplexer 116 is configured to select the inductive sense signal during at least part of the spin-up operation, and once the spindle motor reaches a target velocity, the multiplexer 116 is configured to select the BEMF signal 52 for closed loop control.

Any suitable control circuitry may be employed to implement the flow diagrams in the embodiments of the present invention, such as any suitable integrated circuit or circuits. For example, the control circuitry may be implemented within a power chip, or in a component separate from the power chip, such as a disk controller, or certain steps described above may be performed by a power chip and others by a disk controller. In one embodiment, the power chip and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the power chip or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In yet another embodiment, the control circuitry comprises suitable logic circuitry, such as state machine circuitry.

What is claimed is:

1. A disk drive comprising:
   a disk;
   a head actuated over the disk;
   a spindle motor for rotating the disk, the spindle motor comprising a plurality of windings; and
   control circuitry operable to spin-up the disk by applying a sinusoidal driving signal to each winding of the spindle motor for a spin-up interval, wherein during at least eighty percent of the spin-up interval the sinusoidal driving signals are applied to the windings of the spindle motor open loop.

2. The disk drive as recited in claim 1, wherein:
   the windings of the spindle motor generate a back electromotive force (BEMF) voltage; and
   after the spin-up interval, the control circuitry is further operable to apply a driving signal to each winding of the spindle motor closed loop in response to the BEMF voltage.

3. The disk drive as recited in claim 1, wherein a frequency of the sinusoidal driving signals increases over the spin-up interval in order to accelerate the spindle motor.

4. The disk drive as recited in claim 1, wherein:
   the control circuitry is further operable to generate the sinusoidal driving signals using a sine table comprising a plurality of entries;
   each entry comprises a number of steps; and
   each step corresponds to a fraction of a sinusoidal wave.

5. The disk drive as recited in claim 4, wherein each entry corresponds to a fraction of a spin-up interval.

6. The disk drive as recited in claim 4, wherein the number of steps per entry increases over the spin-up interval to accelerate the spindle motor.

7. The disk drive as recited in claim 6, wherein:
   a first entry corresponds to a first fraction of the spin-up interval; and
   a second entry corresponds to a second fraction of the spin-up interval, wherein the second fraction is different than the first fraction.

8. The disk drive as recited in claim 4, wherein the control circuitry is further operable to measure an initial angular position of the spindle motor in order to determine an initial entry in the sine table to generate the sinusoidal driving signals.

9. The disk drive as recited in claim 8, wherein the control circuitry is further operable to measure an initial angular velocity of the spindle motor in order to determine an initial entry in the sine table to generate the sinusoidal driving signals.

10. The disk drive as recited in claim 1, wherein the control circuitry is further operable to measure an initial angular position of the spindle motor in order to initialize the sinusoidal driving signals.

11. The disk drive as recited in claim 10, wherein the control circuitry is further operable to measure an initial angular velocity of the spindle motor in order to initialize the sinusoidal driving signals.

12. A method of tuning sinusoidal signals applied to windings of a spindle motor to spin-up a disk of a disk drive, the disk drive comprising a head actuated over the disk and a sine table comprising a plurality of entries, wherein:
   each entry corresponds to a fraction of a sinusoidal wave; and
   at least two of the entries correspond to different size fractions of the sinusoidal wave;
the method comprising:
   initializing a first entry of the sine table;
   performing a first spin-up simulation over a first time interval for a plurality of disk drive spindle motors in response to the first entry; and
   configuring a second entry of the sine table in response to a minimum angular position of the spindle motors after the first spin-up simulation.

13. The method as recited in claim 12, wherein:
   the first entry corresponds to a first fraction of the sinusoidal wave;
   the second entry corresponds to a second fraction of the sinusoidal wave; and
   the second fraction is greater than the first fraction.

14. The method as recited in claim 12, wherein each entry corresponds to a fraction of a spin-up interval.

15. The method as recited in claim 14, wherein:
   the first entry corresponds to a first fraction of the spin-up interval; and
   the second entry corresponds to a second fraction of the spin-up interval, wherein the second fraction is different than the first fraction.

16. The method as recited in claim 12, wherein:
   each entry comprises a number of steps;
   each step corresponds to a fraction of the sinusoidal wave; and
   at least two of the steps correspond to the same size fraction of the sinusoidal wave.

17. The method as recited in claim 16, wherein the number of steps in the second entry is greater than the number of steps in the first entry.

18. The method as recited in claim 12, further comprising:
- performing a second spin-up simulation over a second time interval for a plurality of disk drive spindle motors in response to the first and second entries, wherein the second time interval is greater than the first time interval; and
- configuring a third entry of the sine table in response to a minimum angular position of the spindle motors after the second spin-up simulation.

19. The method as recited in claim 18, wherein the second time interval equals the first time interval plus a fraction of a spin-up interval.

20. The method as recited in claim 12, further comprising configuring a number of spindle motor parameters prior to performing the first spin-up simulation.

21. The method as recited in claim 20, wherein the spindle motor parameters comprises a velocity of the spindle motor.

22. The method as recited in claim 20, further comprising configuring the spindle motor parameters in response to a random number.

* * * * *